US012673608B2

(12) United States Patent　　　　　(10) Patent No.:　US 12,673,608 B2

Linsmeier　　　　　　　　　　　　　　(45) Date of Patent:　　Jul. 7, 2026

(54) COORDINATED VEHICLE LIGHTS AND DYNAMIC AERIAL ENVELOPE CONTROL

(71) Applicant: Oshkosh Corporation, Oshkosh, WI (US)

(72) Inventor: Eric Linsmeier, Oshkosh, WI (US)

(73) Assignee: Oshkosh Corporation, Oshkosh, WI (US)

( * ) Notice:　Subject to any disclaimer, the term of this patent is extended or adjusted under 35 U.S.C. 154(b) by 613 days.

(21) Appl. No.: 18/101,458

(22) Filed:　Jan. 25, 2023

(65)　　　　Prior Publication Data

US 2023/0234498 A1　　Jul. 27, 2023

Related U.S. Application Data

(60) Provisional application No. 63/303,667, filed on Jan. 27, 2022.

(51) Int. Cl.
| | |
|---|---|
| *B60Q 7/00* | (2006.01) |
| *B60Q 1/26* | (2006.01) |
| *H05B 47/155* | (2020.01) |
| *H05B 47/165* | (2020.01) |
| *H05B 47/175* | (2020.01) |
| *H05B 47/19* | (2020.01) |

(52) U.S. Cl.
CPC ................ *B60Q 7/00* (2013.01); *B60Q 1/26* (2013.01); *H05B 47/155* (2020.01); *H05B 47/165* (2020.01); *H05B 47/19* (2020.01); *H05B 47/1965* (2024.01); *H05B 47/1985* (2024.01)

(58) Field of Classification Search
CPC .......... B60Q 7/00; B60Q 1/26; H05B 47/155; H05B 47/165
See application file for complete search history.

(56)　　　　References Cited

U.S. PATENT DOCUMENTS

| | | | | |
|---|---|---|---|---|
| 4,216,868 A | * | 8/1980 | Geppert | G01D 5/34792 |
| | | | | 340/685 |
| 4,408,195 A | * | 10/1983 | Tullis | B66C 15/065 |
| | | | | 340/685 |
| 4,910,498 A | * | 3/1990 | Feher | G08B 21/086 |
| | | | | 250/221 |
| 5,049,858 A | * | 9/1991 | Price | G08B 13/2491 |
| | | | | 340/552 |
| 5,552,767 A | * | 9/1996 | Toman | G08B 5/38 |
| | | | | 340/552 |
| 5,760,686 A | * | 6/1998 | Toman | G08B 5/38 |
| | | | | 340/552 |
| 5,774,876 A | * | 6/1998 | Woolley | G01S 13/74 |
| | | | | 700/214 |

(Continued)

*Primary Examiner* — Hoi C Lau

(74) *Attorney, Agent, or Firm* — Foley & Lardner LLP

(57)　　　　ABSTRACT

A vehicle system can include a plurality of portable devices, a vehicle, and a control system. The plurality of portable devices can be configured to be positioned variously about a scene. The vehicle can include a chassis, a cab coupled to the chassis, a body coupled to the chassis, a vehicle lighting device coupled to at least one of the cab or the body, and an aerial device rotatably coupled to at least one of the chassis or the body. The control system can be configured to control an operation of at least one of the vehicle lighting device, the aerial device, or the plurality of portable devices based on a position of the plurality of portable devices and the vehicle at the scene.

18 Claims, 6 Drawing Sheets

500

(56)  References Cited

U.S. PATENT DOCUMENTS

| | | | | |
|---|---|---|---|---|
| 5,939,987 A * | 8/1999 | Cram | G08G 1/095 | 340/573.2 |
| 6,971,329 B1 * | 12/2005 | Stewart | E01F 9/654 | 116/63 P |
| 7,027,773 B1 * | 4/2006 | McMillin | H04L 45/00 | 455/445 |
| 7,030,777 B1 * | 4/2006 | Nelson | G08G 1/0955 | 340/940 |
| 7,088,284 B2 * | 8/2006 | Young | G01S 13/04 | 342/28 |
| 7,230,546 B1 * | 6/2007 | Nelson | G08G 1/0955 | 340/940 |
| 7,859,390 B2 * | 12/2010 | Zuziak | B66F 9/0755 | 340/572.1 |
| 8,154,424 B2 * | 4/2012 | Selevan | G08G 1/095 | 340/908 |
| 8,890,677 B2 * | 11/2014 | Raphaeli | G01S 13/74 | 342/21 |
| 9,437,109 B1 * | 9/2016 | Stafford | B60Q 7/00 | |
| 9,454,885 B2 * | 9/2016 | Raphaeli | G01S 13/74 | |
| 9,940,839 B2 * | 4/2018 | Stafford | E01F 9/615 | |
| 9,987,981 B1 * | 6/2018 | Deyaf | B60Q 5/006 | |
| 10,665,109 B1 * | 5/2020 | Simon | G08G 1/096791 | |
| 11,257,340 B2 * | 2/2022 | Fairweather | G01S 7/003 | |
| 11,386,764 B2 * | 7/2022 | Hageman | G01S 17/86 | |
| 12,020,558 B2 * | 6/2024 | Cho | G08B 5/006 | |
| 12,277,845 B2 * | 4/2025 | Selevan | G08B 5/006 | |
| 2004/0002794 A1 | 1/2004 | Pillar et al. | | |
| 2004/0199302 A1 * | 10/2004 | Pillar | B65F 3/045 | 701/1 |
| 2005/0046567 A1 * | 3/2005 | Mortenson | G07C 9/00 | 340/541 |
| 2005/0104764 A1 * | 5/2005 | Young | G01S 13/04 | 342/27 |
| 2005/0226201 A1 * | 10/2005 | McMillin | H04L 45/00 | 370/348 |
| 2005/0234622 A1 | 10/2005 | Pillar et al. | | |
| 2006/0022001 A1 | 2/2006 | Linsmeier et al. | | |
| 2006/0032701 A1 | 2/2006 | Linsmeier et al. | | |
| 2006/0032702 A1 | 2/2006 | Linsmeier et al. | | |
| 2006/0065411 A1 | 3/2006 | Linsmeier et al. | | |
| 2006/0086566 A1 | 4/2006 | Linsmeier et al. | | |
| 2006/0104054 A1 * | 5/2006 | Coman | G08G 1/0955 | 362/153.1 |
| 2007/0115139 A1 * | 5/2007 | Witte | G08G 1/07 | 340/909 |
| 2007/0120672 A1 * | 5/2007 | Zuziak | B66F 9/0755 | 340/572.1 |
| 2007/0222640 A1 * | 9/2007 | Guelzow, II | G08B 27/001 | 340/908 |
| 2008/0037431 A1 * | 2/2008 | Werb | H04L 9/083 | 370/241 |
| 2008/0042866 A1 * | 2/2008 | Morse | G08B 21/02 | 340/539.1 |
| 2008/0114513 A1 | 5/2008 | Pillar et al. | | |
| 2009/0033044 A1 | 2/2009 | Linsmeier | | |
| 2010/0109898 A1 * | 5/2010 | Kensy | H05B 45/20 | 340/815.73 |
| 2010/0148940 A1 * | 6/2010 | Gelvin | H01Q 9/0464 | 340/286.02 |
| 2010/0148961 A1 * | 6/2010 | Raphaeli | G01S 13/74 | 340/552 |
| 2012/0262304 A1 * | 10/2012 | Cripps | G08G 1/0955 | 340/908 |
| 2013/0214924 A1 * | 8/2013 | Ko | H05B 47/105 | 340/522 |
| 2013/0271294 A1 * | 10/2013 | Selevan | G08G 1/095 | 340/907 |
| 2013/0293396 A1 * | 11/2013 | Selevan | F21V 23/0471 | 340/907 |
| 2013/0335219 A1 * | 12/2013 | Malkowski | G08B 13/2491 | 340/539.22 |
| 2014/0062695 A1 * | 3/2014 | Rosen | G08B 21/0219 | 340/539.13 |
| 2014/0071681 A1 * | 3/2014 | Ghafoori | E01F 9/654 | 362/249.14 |
| 2014/0262355 A1 | 9/2014 | Linsmeier | | |
| 2015/0091716 A1 * | 4/2015 | Hathaway | G01S 7/003 | 340/435 |
| 2015/0156567 A1 * | 6/2015 | Oliver | G08B 21/0227 | 340/870.07 |
| 2016/0186971 A1 * | 6/2016 | Selevan | H05B 47/1985 | 362/234 |
| 2016/0304028 A1 * | 10/2016 | Hathaway | G01S 13/931 | |
| 2017/0200306 A1 * | 7/2017 | Marsolek | E02F 9/262 | |
| 2017/0320507 A1 * | 11/2017 | Denny | E01F 9/30 | |
| 2018/0132285 A1 * | 5/2018 | Jackson | G08B 5/002 | |
| 2018/0215354 A1 | 8/2018 | Linsmeier et al. | | |
| 2018/0215597 A1 | 8/2018 | Linsmeier et al. | | |
| 2018/0289999 A1 | 10/2018 | Kay et al. | | |
| 2018/0293818 A1 | 10/2018 | Linsmeier et al. | | |
| 2018/0297597 A1 | 10/2018 | Linsmeier et al. | | |
| 2019/0174276 A1 * | 6/2019 | Mineiro Ramos de Azevedo | H04W 4/44 | |
| 2019/0220678 A1 * | 7/2019 | Guo | G06T 7/73 | |
| 2019/0262646 A1 | 8/2019 | Linsmeier et al. | | |
| 2019/0263408 A1 | 8/2019 | Linsmeier et al. | | |
| 2019/0340909 A1 * | 11/2019 | Nguyen | B25J 9/1676 | |
| 2019/0359184 A1 | 11/2019 | Linsmeier et al. | | |
| 2019/0359460 A1 | 11/2019 | Linsmeier et al. | | |
| 2020/0108285 A1 | 4/2020 | Kay et al. | | |
| 2020/0238115 A1 | 7/2020 | Linsmeier et al. | | |
| 2020/0279444 A1 | 9/2020 | Linsmeier et al. | | |
| 2021/0065530 A1 * | 3/2021 | Fairweather | E01F 9/30 | |
| 2021/0065540 A1 * | 3/2021 | Galden | G01C 21/3415 | |
| 2021/0097839 A1 * | 4/2021 | Hageman | G01S 13/87 | |
| 2021/0107361 A1 | 4/2021 | Linsmeier et al. | | |
| 2021/0237777 A1 * | 8/2021 | Selevan | G06V 20/56 | |
| 2021/0253102 A1 | 8/2021 | Linsmeier et al. | | |
| 2021/0255636 A1 * | 8/2021 | Kerzner | G05D 1/0027 | |
| 2021/0339065 A1 | 11/2021 | Linsmeier et al. | | |
| 2022/0009761 A1 | 1/2022 | Archer et al. | | |
| 2022/0024425 A1 | 1/2022 | Linsmeier et al. | | |
| 2022/0025611 A1 * | 1/2022 | Kandula | G06F 3/016 | |
| 2022/0074417 A1 | 3/2022 | Linsmeier et al. | | |
| 2022/0080944 A1 | 3/2022 | Linsmeier et al. | | |
| 2022/0097527 A1 | 3/2022 | Koga et al. | | |
| 2022/0097961 A1 | 3/2022 | Koga et al. | | |
| 2022/0097964 A1 | 3/2022 | Koga et al. | | |
| 2022/0112061 A1 | 4/2022 | Archer et al. | | |
| 2022/0117144 A1 * | 4/2022 | Yuasa | H04B 7/15507 | |
| 2022/0150758 A1 * | 5/2022 | Zotti | H04W 48/20 | |
| 2022/0157135 A1 * | 5/2022 | Cho | F16P 3/147 | |
| 2022/0185582 A1 | 6/2022 | Koga et al. | | |
| 2022/0193473 A1 | 6/2022 | Kay et al. | | |
| 2022/0309844 A1 | 9/2022 | Linsmeier et al. | | |
| 2022/0355140 A1 | 11/2022 | Linsmeier et al. | | |
| 2022/0355141 A1 | 11/2022 | Linsmeier et al. | | |
| 2022/0355142 A1 | 11/2022 | Linsmeier et al. | | |
| 2022/0355690 A1 | 11/2022 | Linsmeier et al. | | |
| 2022/0379892 A1 | 12/2022 | Archer et al. | | |
| 2023/0089417 A1 | 3/2023 | Koga et al. | | |
| 2023/0215258 A1 * | 7/2023 | Selevan | G08B 5/006 | 340/933 |
| 2023/0234498 A1 * | 7/2023 | Linsmeier | H05B 47/1965 | |
| 2023/0264931 A1 * | 8/2023 | Tressler | B66F 9/0655 | 414/718 |
| 2024/0046789 A1 * | 2/2024 | Lewing | H04W 4/46 | |
| 2024/0068650 A1 * | 2/2024 | Selevan | F21V 23/0407 | |
| 2024/0355212 A1 * | 10/2024 | Linsmeier | H04W 4/024 | |
| 2025/0078656 A1 * | 3/2025 | Kobel | B60Q 7/00 | |
| 2025/0122066 A1 * | 4/2025 | Miller | B66F 9/0755 | |

* cited by examiner

COORDINATED VEHICLE LIGHTS AND DYNAMIC AERIAL ENVELOPE CONTROL

CROSS-REFERENCE TO RELATED PATENT APPLICATION

This application claims the benefit of and priority to U.S. Provisional Patent Application No. 63/303,667, filed Jan. 27, 2022, which is incorporated herein by reference in its entirety

BACKGROUND

In various circumstances, one or more vehicles and related assets (e.g., operators or other personnel) are deployed to a locations such a work site, a scene of an emergency or accident, etc. to perform various tasks. In some cases, the one or more vehicles and related assets may be deployed to a location where individuals, equipment, obstacles, etc. that are not associated with the one or more vehicles and related assets may also be present at the location. To ensure that the one or more vehicles and related assets can perform various tasks at a location that does not place other individuals, equipment, or obstacles at risk, it may be necessary to establish a perimeter around the location.

SUMMARY

One embodiment relates to a vehicle system. The vehicle system can include a plurality of portable devices, a vehicle, and a control system. The plurality of portable devices can be configured to be positioned variously about a scene. The vehicle can include a chassis, a cab coupled to the chassis, a body coupled to the chassis, a vehicle lighting device coupled to at least one of the cab or the body, and an aerial device rotatably coupled to at least one of the chassis or the body. The control system can be configured to control an operation of at least one of the vehicle lighting device, the aerial device, or the plurality of portable devices based on a position of the plurality of portable devices and the vehicle at the scene.

Another embodiment relates to a vehicle system. The vehicle system can include a vehicle and a control system. The vehicle can include a chassis, a cab coupled to the chassis, a body coupled to the chassis, a vehicle lighting device coupled to at least one of the cab or the body, and an aerial device rotatably coupled to at least one of the chassis or the body. The control system can be configured to control the vehicle lighting device and the lift assembly based on a position of at least one of (a) a plurality of portable devices or (b) one or more second vehicles positioned proximate the vehicle at a scene.

Still another embodiment relates to a vehicle system. The vehicle system can include a vehicle and a control system. The vehicle can include a chassis, a cab coupled to the chassis, a body coupled to the chassis, and a vehicle lighting system coupled to at least one of the cab or the body. The control system can be configured to coordinate operation of the vehicle lighting system and a plurality of portable lighting devices selectively deployed proximate the vehicle by controlling illumination of the plurality of portable lighting devices and the vehicle lighting device (a) according to a predefined or selected sequence or pattern and (b) based on a position of each of the plurality of portable lighting devices relative to the vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
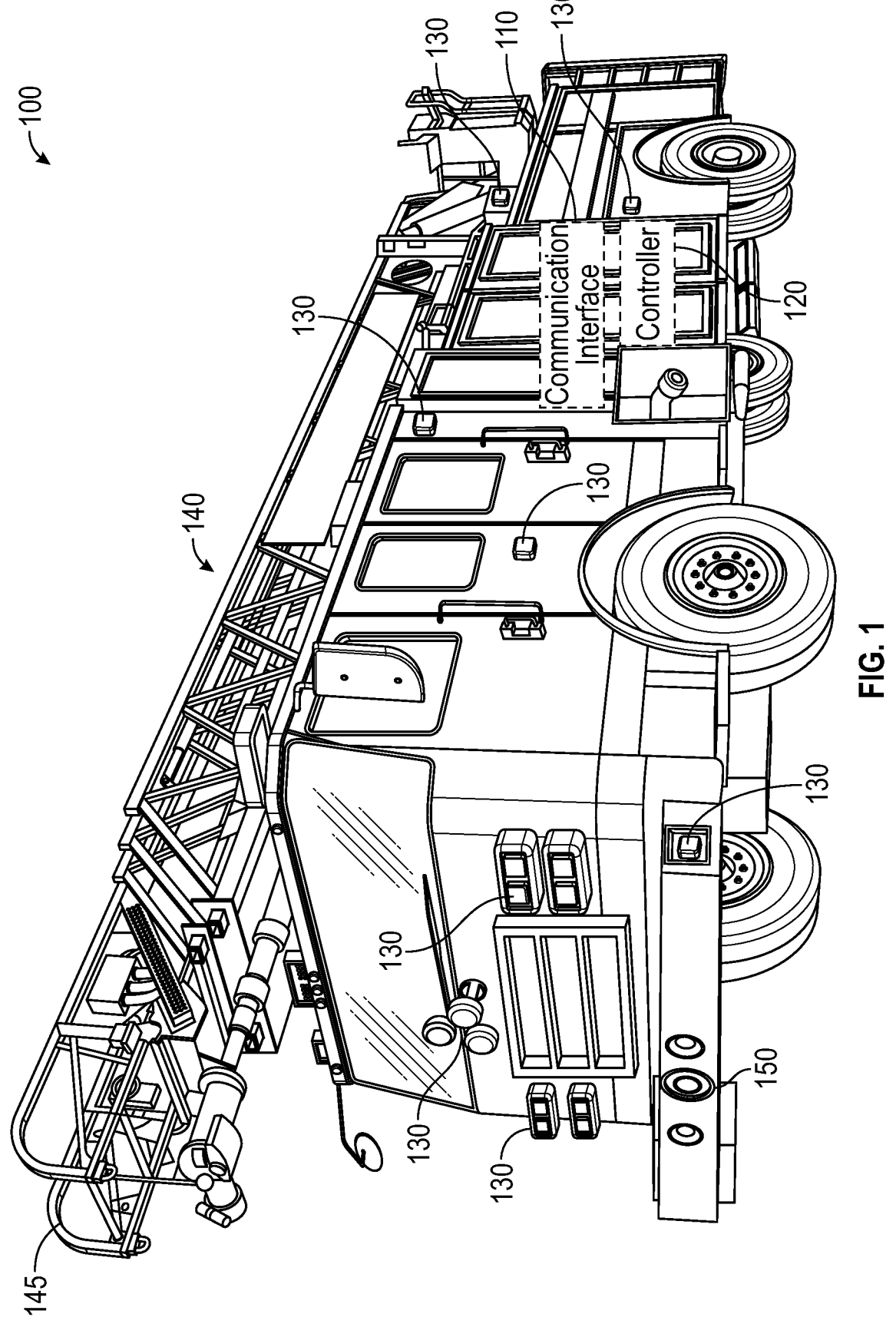
FIG. 1 is a front perspective view of an emergency vehicle, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for coordinating vehicle lights and dynamically controlling an aerial lift device. The systems, apparatuses, and methods include a vehicle or other assets and one or more beacon devices that communicate with the vehicles or other assets. The vehicle (or other assets) and the one or more beacon devices may be deployed to a scene, such as an emergency scene, work site, etc. The one or more beacon devices may be communicably coupled to the vehicle via a wireless communication protocol, whereby the one or more beacon devices and vehicle may send and receive various signals to coordinate control of the beacon devices and vehicle. Likewise, each of the one or more beacon devices may communicate with other beacon devices via a wireless communication protocol.

In some embodiments, coordinating the operation of the one or more beacon devices and the vehicle (or other assets) allows for a boundary or perimeter to be established around an emergency scene or work site. More specifically, one beacon device may be communicably coupled to other beacon devices (e.g., neighboring beacon devices in series or a plurality of other beacon devices in a mesh network arrangement). The boundary or perimeter may be a "virtual fence" that defines an operating envelope for the vehicle, where the movement of the vehicle is at least partially confined to the operating envelope. For example, movement may be prevented or restricted beyond the operating envelope. The operation (e.g., rotation or extension) of an aerial ladder device on a fire-fighting vehicle, for example, may be prohibited beyond the perimeter of the virtual fence, while the same operation is allowed within the virtual fence. In another example, the virtual fence may be configured to determine when a vehicle or asset crosses the virtual fence so that accurate inventory of vehicles or assets within the fence may be maintained. Operations of the vehicle relative to the virtual fence may be managed by a controller of the vehicle.

The controller of the vehicle may also be configured to coordinate a plurality of lighting devices, a plurality of alert devices, or an implement (e.g., a ladder assembly, a telescoping boom, a scissor lift, or some other device) with a plurality of remotely positioned beacon devices. For example, if the vehicle and beacon devices are at the scene of an emergency, the controller may coordinate operation of the beacon devices with the operation of the vehicle such that lighting devices associated with the beacon devices and lighting devices associated with the vehicle all emit light according to a predefined sequence or pattern. In this way, beacon devices placed at a scene but located remotely from the vehicle may serve to alert bystanders as to potential danger, for example. Moreover, if and when danger subsides, the lighting devices of the beacon devices may be turned off (i.e., stop emitting light) when the lighting devices of the vehicle change, for example. Likewise, as the status of the vehicle changes or as the circumstances at the scene change (e.g., a dangerous condition suddenly arises), a visual or audible alert may be pushed to each of the beacon devices in order to ensure that all bystanders and personnel at the scene are promptly notified.

Figure 2:
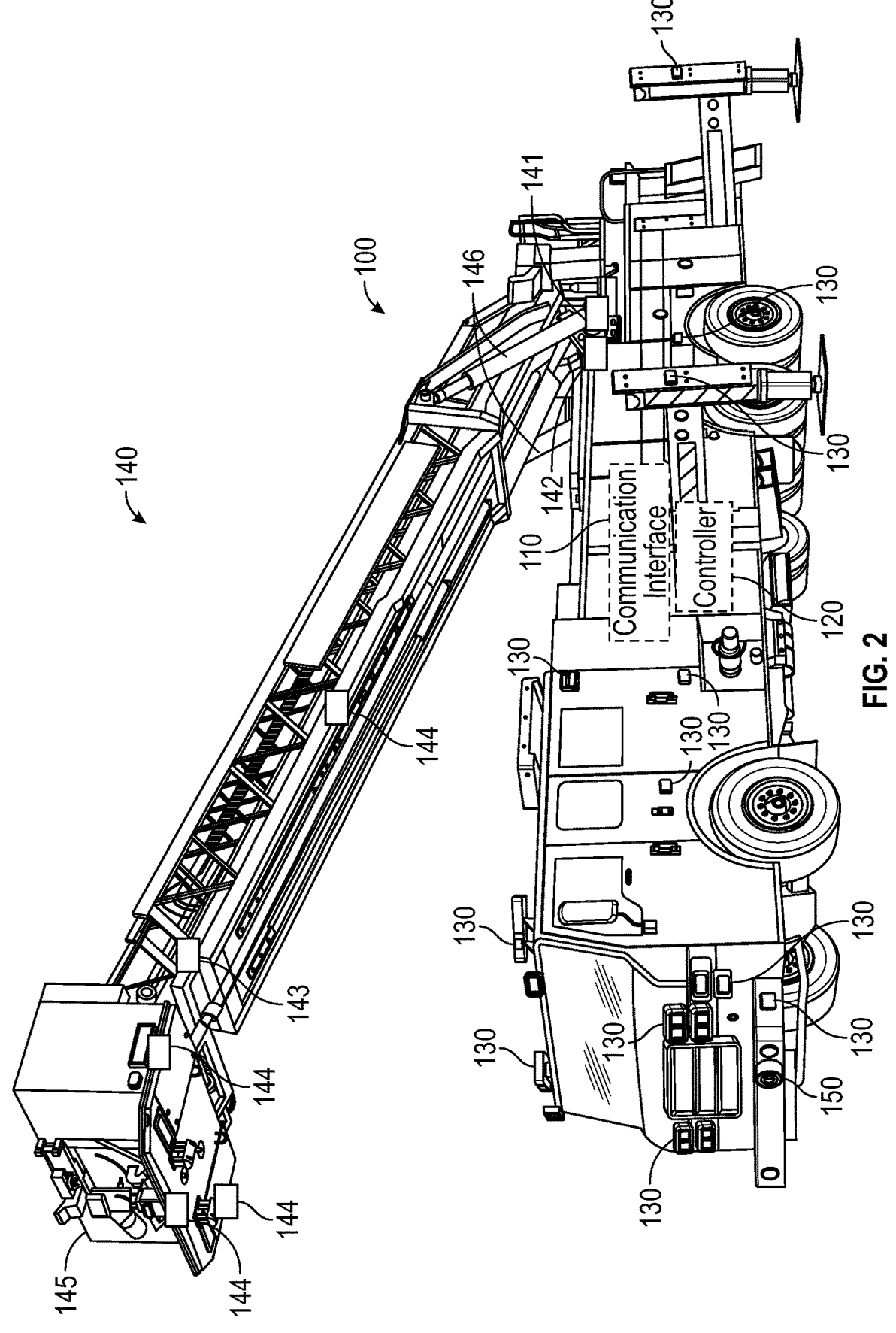
FIG. 2 is another front perspective view of the emergency vehicle of FIG. 1, according to an exemplary embodiment.

Referring now to FIGS. 1 and 2, a vehicle 100 is shown. As shown in FIGS. 1 and 2, the vehicle 100 includes a communication interface 110, a controller 120, one or more lighting systems or devices 130, and one or more alert devices 150. In some embodiments, the vehicle 100 includes a lift assembly 140 (e.g., an aerial device or other device), which is shown in FIGS. 1 and 2 as a ladder assembly. According to an exemplary embodiment, the vehicle 100 is an aerial ladder fire fighting vehicle that is periodically deployed to an emergency scene, such as the scene of a motor-vehicle accident, a house fire, or some other scene. In other embodiments, the vehicle 100 does not include the lift assembly 140 (e.g., a ladder assembly, an aerial device, or some other device) or other lift device. Instead, the vehicle 100 may be another type of emergency or response vehicle such as a "pumper" fire fighting vehicle, an ambulance, a law enforcement vehicle, a security vehicle, an Aircraft Rescue and Fire Fighting (ARFF) vehicle, a tow truck, or some other vehicle that responds to scenes (e.g., accidents, fires, criminal activity, etc.). In some embodiments, the vehicle 100 is not an emergency vehicle, but rather the vehicle 100 is any type of vehicle that has exterior lights onboard and/or an aerial implement (e.g., a boom arm, a bucket, a crane arm, a concrete pumper arm, forks, a construction vehicle with a construction hazard light or light bar, a dump truck, a mixer truck, a boom lift, a telehandler, a bucket truck, etc.). Although FIGS. 1, 2, and 4-6 describe the systems, apparatuses, and methods in the context of emergency vehicles, it should also be appreciated that other non-vehicle assets (e.g., portable command center) or other non-emergency vehicle assets may be used to implement all or some of the systems, apparatuses, and methods described herein.

The communication interface 110 may be configured to facilitate wireless communication between the emergency vehicle 100 and other assets (e.g., additional emergency vehicles, personnel having mobile computing devices, a central dispatch location) and/or one or more beacon devices, as discussed below. More specifically, the communication interface 110 may facilitate communication between the controller 120 of the vehicle 100 and various other vehicles, assets, and/or beacon devices. The communication interface 110 may include programming and/or hardware-based components that connect the controller 120 of the vehicle 100 to other vehicles, assets, and/or beacon devices over a network. For example, the communication interface 110 may include any combination of a wireless network transceiver (e.g., Bluetooth® transceiver, cellular modem, a Wi-Fi® transceiver) and/or wired network transceiver (e.g., an Ethernet transceiver). In some arrangements, the communication interface 110 includes hardware and machine-readable media structured to support communication over multiple channels of data communication (e.g., wireless, Bluetooth®, near-field communication, etc.). In yet other arrangements, the communication interface 110 may include one or more cryptography modules to establish a secure communication session (e.g., using the IPSec protocol or similar) in which data communicated over the session is encrypted and securely transmitted.

According to an exemplary embodiment, the controller 120 is communicably coupled to the communication interface 110. In some embodiments, the controller 120 includes the communication interface 110. The controller 120 may also include a processing circuit. The processing circuit may include one or more processors and a memory. The processor may be a general or specific purpose processor, an application specific integrated circuit (ASIC), one or more field programmable gate arrays (FPGAs), a group of processing components, or other suitable processing components. According to an exemplary embodiment, the one or more processors may be coupled to the memory and may be configured to execute computer code or instructions stored in the memory or received from other computer-readable media (e.g., USB drive, network storage, remote server, etc.). The memory may include one or more memory devices (e.g., memory units, storage devices, etc.) for storing data and/or computer code for completing and/or facilitating the various processes described herein. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities described herein in connection with the systems, apparatuses, and methods for coordinating vehicle lights and dynamically controlling an operating envelope of a vehicle. The memory may be communicably coupled to the processor and may include computer code that, when executed by the one or more processors, performs one or more of the processes described herein.

The controller 120 may be configured to transmit commands, data, or information to one or more other vehicles, assets, and/or beacon devices, where the commands, data, or information may be transmitted via the communication interface 110, as described above. Likewise, the controller 120 may be configured to receive commands, data, or information from one or more other vehicles, assets, or beacon devices, where the commands, data, or information may be received via the communication interface 110. In some embodiments, the commands, data, or information transmitted from or received by the controller 120 is related to the coordination of vehicle lighting devices with lighting devices of other vehicles, lighting devices of assets, and/or lighting devices of one or more beacon devices, as is discussed in detail below. In some embodiments, the commands, data, or information transmitted from or received by the controller 120 is additionally or alternatively related to a virtual boundary established by a plurality of coordinated beacon devices, assets, and/or vehicles. More specifically, a virtual boundary may be established to coordinate lighting devices in a particular way, monitor the vehicles or assets present at a scene, and/or to dynamically control an operating envelope associated with the lift assembly 140 (e.g., aerial device) of the vehicle 100. Each of these examples is discussed in detail below.

The controller 120 may be communicably coupled to one or more vehicle systems, such as various hydraulic systems, electrical systems, electromechanical systems, or otherwise. For example, the controller 120 may be communicably coupled to electrical motors associated with the movement of the lift assembly 140 relative to the vehicle 100, as is discussed in greater detail below. Likewise, the controller 120 may be communicably coupled to various hydraulic control valves and hydraulic cylinders associated with the lift assembly 140. The controller 120 may also be communicably coupled to an engine, a pumping system, a lighting system, and/or another system of the vehicle 100. In various embodiments, the controller 120 may be configured to transmit commands, data, or information to the various systems of the vehicle 100 in order to control (i.e., permit, prevent, modify) various functions of the vehicle. For example, the controller 120 may be configured to transmit a command to the hydraulic system associated with the lift assembly 140 to prevent the lift assembly 140 from extending beyond a certain point, as is described in detail below.

As shown in FIGS. 1 and 2, the vehicle 100 includes a plurality of the lighting devices 130 (e.g., a roof light bar, hazard lights, headlights, taillights, side indicators, etc.). According to an exemplary embodiment, the lighting devices 130 are configured to emit light in various patterns, with various colors, at various frequencies, and/or with various intensities or brightness. For example, the lighting devices 130 may emit a pulsing light, a strobing light, a constant light (e.g., spotlight), colored lights, etc. The lighting devices 130 may be flashing lights or controlled to flash such that, when flashing, indicate that the vehicle 100 is deployed for emergency purposes (e.g., to respond to a fire, a motor vehicle accident, etc.). Furthermore, and as shown in FIGS. 1 and 2, the lighting devices 130 are mounted or otherwise affixed to the vehicle 100 at or on a plurality of vehicle surfaces (e.g., front, top, sides, back, etc.) of the vehicle 100 such that the light emitted from the lighting devices 130 may be seen from various viewpoints around the vehicle 100. In some embodiments, one or more of the lighting devices 130 are configured to emit a constant, bright light in order to illuminate a scene so that operators, emergency personnel, etc. may be able to see an otherwise dark emergency scene, for example.

The alert devices 150 may be or include a siren, a horn, and/or a loudspeaker. The alert devices 150 may be configured to provide an audible indication of a status of the vehicle 100. According to an exemplary embodiment, the alert devices 150 are configured to produce a noise to alert bystanders that the vehicle 100 is being deployed or en route to a scene, such as an emergency scene. In some embodiments, the alert devices 150 is configured to facilitate broadcasting a verbal message to bystanders.

As shown in FIG. 2, a first or proximal end of the lift assembly 140 (e.g., aerial device) is rotatably and/or pivotably mounted to a top surface of the vehicle 100 such that the lift assembly 140 may pivot vertically and/or horizontally with respect to the vehicle 100 (e.g., rotate from one side of the vehicle 100 to the other, elevate, etc.). As shown in FIG. 1, the lift assembly 140 has a resting position where a second or distal end 145 of the lift assembly 140 is proximate to a front of the vehicle 100 (e.g., for a rear mount aerial ladder implementation). In other embodiments, the lift assembly 140 has a resting position where the distal end 145 of the lift assembly 140 is proximate to a rear of the vehicle 100 (e.g., for a mid-mount aerial ladder implementation). As shown in FIG. 2, the lift assembly 140 may be moved from the resting position to an elevated position where the lift assembly 140 is rotated, lifted, or pivoted about the proximal end.

As indicated above, the lift assembly 140 (e.g., aerial device) may be rotatably mounted to the vehicle 100. Put another way, the lift assembly 140 may rotate horizontally about a vertical axis extending perpendicular to a top surface of the vehicle 100. In some embodiments, a rotation actuator (e.g., electric motor, hydraulically operated motor, etc.) includes a drive pinion. The lift assembly 140 may be coupled to a slew bearing that rotates about the aforementioned vertical axis. The drive pinion may be coupled to a drive gear of the slew bearing. Rotation of an output shaft of the rotation actuator will cause the pinion to transfer rotational energy to the drive gear of the slew bearing, thus causing the lift assembly 140 to rotate about the vertical axis via the slew bearing. The rotation actuator is communicably coupled to the controller 120, according to an exemplary embodiment.

The lift assembly 140 (e.g., aerial device) may also rotate in a second direction, namely in a vertical direction so that the lift assembly 140 may extend at an angle (e.g., an ascending angle, a descending angle, etc.) from a top surface of the vehicle 100. In other words, the lift assembly 140 may rotate about a horizontal axis that is approximately parallel to a top surface of the vehicle 100. As shown in FIG. 2, the lift assembly 140 includes one or more actuators 146 (e.g., linear actuators, hydraulic cylinders, electrically operated actuators, etc.) that are configured to pivot the lift assembly 140 about the horizontal axis. More specifically, the actuators 146 may cause the lift assembly 140 to pivot in a first direction (i.e., to increase an angle of rotation of the ladder 140 with respect to the vehicle 100) when the actuators 146 extend. The actuators 146 may similarly cause the lift assembly 140 to pivot in a second direction (i.e., to decrease an angle of rotation of the ladder 140 with respect to the vehicle 100). The actuators 146 are communicably coupled to the controller 120, according to an exemplary embodiment.

The lift assembly 140 may also include a plurality of telescoping ladder elements or sections. Each of the telescoping ladder sections may be slidably coupled to adjacent ladder sections and may be configured to extend or retract with respect to adjacent ladder sections. By translating adjacent ladder sections, the lift assembly 140 may thus be extended or retracted. For example, the lift assembly 140 may be extended to a length that exceeds a length of a single ladder section. In some embodiments, the lift assembly 140 may extend to a length of at least fifty feet, at least seventy-five feet, at least one hundred feet, or some other length. The lift assembly 140 may further include one or more extension actuators to facilitate the extension or retraction of the sections of the lift assembly 140. The extension actuators may be linear hydraulic actuators, a rack and pinion system, a pulley system, or otherwise. The extension actuators may be hydraulically or electrically driven. The extension actuators may be communicably coupled to the controller 120.

Because the lift assembly 140 is both pivotable with respect to the vehicle 100 and extendable, as described above, the lift assembly 140 may extend from the vehicle 100 in multiple directions. According to an exemplary embodiment, an operating envelope may be defined by maximum extension of the lift assembly 140 at all angles of rotation, including both horizontal rotation and vertical rotation. As will be appreciated, the vehicle 100 may periodically be deployed to a scene or area where immovable obstacles exist within the aforementioned operating envelope, or there may otherwise be portions of the scene or area where the lift assembly 140 should not otherwise be extended into. For this reason, it may be necessary to limit the maximum extension of the lift assembly 140 at certain angles of rotation, as will be discussed in detail below.

In order to determine a position of the lift assembly 140 at a particular moment, the lift assembly 140 may further include a plurality of sensors configured to record data related to the position of the lift assembly 140. As shown in FIG. 2, the lift assembly 140 includes a lift angle sensor 141, a turret rotation sensor 142, one or more length sensors 143, and one or more proximity sensors 144. Each of the lift angle sensor 141, the turret rotation sensor 142, the length sensors 143, and the proximity sensors 144 may be configured to periodically or continuously transmit data to the controller 120 via the communication interface 110. With this data, the controller 120 may be configured to determine a precise orientation of the lift assembly 140 at a particular moment in time.

The lift angle sensor 141 may be configured to determine the angular orientation of the lift assembly 140 with respect to the vehicle 100. More specifically, the lift angle sensor 141 may be configured to determine an angle of rotation of the lift assembly 140 about the horizontal axis. As the lift assembly 140 rotates about the horizontal axis, the lift angle sensor 141 is configured to determine an instantaneous angular orientation of the lift assembly 140 with respect to the vehicle 100, according to an exemplary embodiment. Using data recorded by the lift angle sensor 141, the controller 120 may be configured to determine whether and to what degree the lift assembly 140 is raised or lowered from the top surface of the vehicle 100, for example.

The turret rotation sensor 142 may be configured to determine the angular orientation of the lift assembly 140 with respect to the vehicle 100. More specifically, the turret rotation sensor 142 may be configured to determine an angle of rotation of the lift assembly 140 about the vertical axis. Using the data recorded by the turret rotation sensor 142, the controller 120 may be configured to determine whether and to what degree the lift assembly 140 is rotated with respect to a resting or stowed position of the lift assembly 140 (e.g., where the distal end 145 of the lift assembly 140 is proximate to the front of the vehicle 100). For example, the data recorded by the turret rotation sensor 142 may be used by the controller 120 determine that the lift assembly 140 is rotated thirty-five degrees in a clockwise direction from the resting or stowed position such that the lift assembly 140 is extending off to the right of the vehicle 100. Likewise, the data recorded by the turret rotation sensor 142 may be used by the controller 120 to determine that the lift assembly 140 is rotated ninety degrees in a counter-clockwise direction from the resting or stowed position such that the lift assembly 140 is extending off to the left of the vehicle 100, for example.

The one or more length sensors 143 may be configured to determine a length of the lift assembly 140. As noted above, the lift assembly 140 may include a plurality of ladder sections that translate with respect to each other facilitate the extension of the distal end 145 of the lift assembly 140. The lift assembly 140 may have a retracted length when each of the ladder sections are fully retracted. Likewise, the lift assembly 140 may have and a fully extended length when each of the ladder sections are fully extended. When the lift assembly 140 is neither fully extended nor fully retracted, the lift assembly 140 may have a partially extended length. According to an exemplary embodiment, the one or more length sensors 143 are configured to facilitate determining the length of the lift assembly 140, particularly when the lift assembly 140 is partially extended, by measuring the linear translation of the various ladder sections with respect to each other. The length sensors 143 may be linear position sensors that determine the position of a ladder section with respect to other ladder sections. More specifically, the length sensors 143 could be cable-based length sensors, optical sensors, laser-based sensors, or some other sensing device. In other embodiments, the length of the lift assembly 140 is determined indirectly, such as by measuring the hydraulic pressure in one or more linear hydraulic actuators that extend/retract the lift assembly 140, or by monitoring an amount of time for an extension or retraction operation using the extension actuators.

The one or more proximity sensors 144 may be affixed at various locations along the lift assembly 140 and configured to detect the proximity of a particular point of the lift assembly 140 to various obstacles (e.g., buildings, trees, power lines, etc.) or other devices (e.g., beacon devices, other vehicles, etc.). According to an exemplary embodiment, the proximity sensors 144 are configured to determine the position of the lift assembly 140 relative to a virtual obstacle such as a virtual fence, perimeter, or boundary established by one or more beacon devices as described in greater detail herein. In various embodiments, the proximity sensors 144 are configured to communicate with one or more beacon devices and/or the controller 120 in order to determine when the lift assembly 140 is proximate to the virtual boundary or to a respective beacon device. In such embodiments, the proximity sensors 144 may determine proximity to a beacon device by measuring signal strength, a time between transmitted signals, or by some other means, such as via an ultrasonic rangefinder device. The proximity sensors 144 may be configured to determine the proximity of a particular point of the lift assembly 140 to multiple beacon devices, whereby the location of the lift assembly 140 can be determined by triangulation or other some other means or protocol. In other embodiments, the proximity sensors 144 are radio frequency identification (RFID) devices or ultra-wideband (UWB) devices that facilitate monitoring the precise location of the lift assembly 140 with respect to some reference point, such as a point on the vehicle 100 or one or more beacon devices using machine to machine (M2M) communication. In yet other embodiments, the proximity sensors 144 are global positioning devices configured to monitor the GPS position of the lift assembly 140.

As noted above, the controller 120 may be configured to determine a precise orientation of the lift assembly 140 using data acquired or recorded by the lift angle sensor 141, the turret rotation sensor 142, the length sensors 143, and/or the proximity sensors 144. In some embodiments, the controller 120 is configured to determine the orientation of the lift assembly 140 relative to the vehicle 100 (e.g., determine that the lift assembly 140 is extended 50 feet from and to the side of the vehicle 100). In some embodiments, the controller 120 is additionally or alternatively configured to determine a position of the lift assembly 140 with respect to some other point of reference such as a virtual boundary established by one or more beacon devices (e.g., beacon devices 200). More specifically, the controller 120 may determine that the distal end 145 of the lift assembly 140 is proximate to the virtual boundary. In other embodiments, the controller 120 may determine that another portion of the lift assembly 140 (e.g., a medial portion) is proximate to the virtual boundary.

Figure 3:
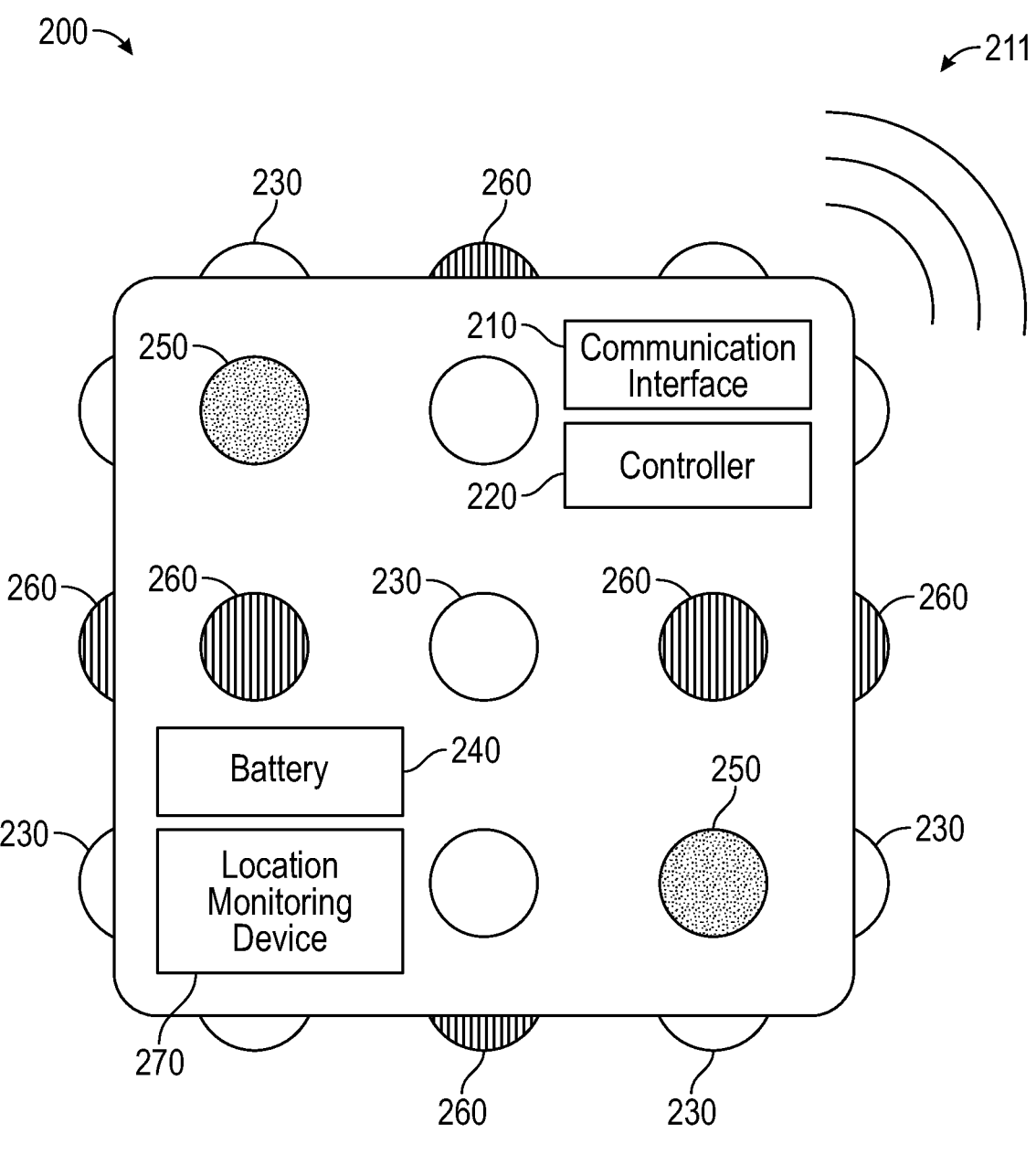
FIG. 3 is a top view of a beacon device, according to an exemplary embodiment.

Referring now to FIG. 3, a beacon device 200 is shown. As shown in FIG. 3, the beacon device 200 includes a communication interface 210, a controller 220, one or more lighting devices 230, a battery 240, one or more alert devices 250, one or more sensor devices 260, and a location monitoring device 270. In some embodiments, the beacon device 200 does not includes one or more of the aforementioned components or devices. According to an exemplary embodiment, each of the beacon devices 200 may be portable and of a relatively compact size such that multiple beacon devices 200 can easily be stowed on or in the vehicle 100 and placed at a scene or in an area proximate to the vehicle 100 by an operator of the vehicle 100 or other personnel.

The communication interface 210 may be configured to facilitate wireless communication between the beacon device 200 and the vehicle 100, other beacon devices 200, and/or other assets (e.g., additional emergency vehicles, personnel having mobile computing devices, a central dispatch location). More specifically, the communication interface 210 may facilitate communication between the controller 220 of the beacon device 200 and the vehicle 100, a plurality of other beacon devices 200, other vehicles, assets, etc. The communication interface 210 may include programming and/or hardware-based components that connect the controller 220 of the beacon device 200 to the vehicles 100, other beacon devices 200, or other assets over a network. For example, the communication interface 210 may include any combination of a wireless network transceiver (e.g., Bluetooth® transceiver, cellular modem, a WiFi® transceiver) and/or wired network transceiver (e.g., an Ethernet transceiver). In some arrangements, the communication interface 210 includes hardware and machine-readable media structured to support communication over multiple channels of data communication (e.g., wireless, Bluetooth®, near-field communication, etc.). In yet other arrangements, the communication interface 210 may include one or more cryptography modules to establish a secure communication session (e.g., using the IPSec protocol or similar) in which data communicated over the session is encrypted and securely transmitted.

The controller 220 may be communicably coupled to the communication interface 210. In other embodiments, the controller 220 may include the communication interface 210. The controller 220 may also include a processing circuit, the processing circuit including one or more processors and a memory. The processor may be a general or specific purpose processor, an application specific integrated circuit (ASIC), one or more field programmable gate arrays (FPGAs), a group of processing components, or other suitable processing components. According to an exemplary embodiment, the one or more processors may be coupled to the memory and may be configured to execute computer code or instructions stored in the memory or received from other computer-readable media (e.g., USB drive, network storage, remote server, etc.). The memory may include one or more memory devices (e.g., memory units, storage devices, etc.) for storing data and/or computer code for completing and/or facilitating the various processes described herein. The memory may include random access memory (RAM), read-only memory (ROM), hard drive storage, temporary storage, non-volatile memory, flash memory, optical memory, or any other suitable memory for storing software objects and/or computer instructions. The memory may include database components, object code components, script components, or any other type of information structure for supporting the various activities described herein in connection with the systems, apparatuses, and methods for coordinating vehicle lights and dynamically controlling an operating envelope of a vehicle. The memory may be communicably coupled to the processor and may include computer code that, when executed by the one or more processors, performs one or more of the processes described herein.

According to an exemplary embodiment, the controller 220 is communicably coupled to the communication interface 210, the lighting devices 230, the battery 240, the alert devices 250, the sensors 260, and the location monitoring device 270. The controller 220 may be configured to receive data or information from the lighting devices 230, the battery 240, the alert devices 250, the sensors 260, and/or the location monitoring device 270. The data may be indicative of a status of each of the communicably coupled devices (e.g., a status of the lighting devices 230 as being "ON" or operating in a particular mode). In other embodiments, the data or information may be data acquired or recorded by the sensors 260, location data determined by the location monitoring device 270, etc. The controller 220 may also be configured to command or control the operation of each of the aforementioned communicably coupled devices. For example, the controller 220 may be configured to control the operation of the lighting devices 230 (e.g., commanding the lighting devices 230 to turn on, commanding the lighting devices 230 to switch operating modes, etc.).

The beacon device 200 transmits a signal 211 that is configured to be received by other devices, such as other beacon devices 200, a vehicle 100, or other assets, according to an exemplary embodiment. The signal 211 of each beacon device 200 of the plurality of beacon devices 200 may have a unique signal signature such that the signal 211 for one beacon device 200 may be identified from a plurality of signals 211 of other beacon devices 200. In other words, the signal 211 of each beacon device 200 may be isolated from other signals 211 such that any information, data, commands, from a particular beacon device 200 may be isolated or separately interpreted by a receiving device, such as the controller 120 of the vehicle 100.

In various embodiments, the beacon device 200 is configured to transmit commands, data, or information to other devices, such as the vehicle 100, other beacon devices 200, or otherwise. The commands, data, or information of signal 211 may be transmitted via the communication interface 210, as described above. Likewise, the controller 220 may be configured to receive commands, data, or information from one or more other vehicles, assets, or beacon devices, where the commands, data, or information may be received via the communication interface 210. In some embodiments, the commands, data, or information transmitted from or received by the controller 220 is related to (a) the coordination of lighting devices 230 or alert devices 250 with lighting devices 130 or alert devices 250 of the vehicle 100, (b) the coordination of lighting devices 230 or alert devices 250 with lighting devices 230 or alert devices 250 of other beacon devices 200, or (c) some combination of devices associated with a vehicle 100, other beacon devices 200, or otherwise. In some embodiments, the commands, data, or information transmitted from or received by the controller 220 is related to a virtual boundary established by the beacon device 200 and one or more other beacon devices 200, assets, or vehicles 100. More specifically, a virtual boundary may be established to coordinate lighting devices in a particular way, monitor the vehicles or assets present at a scene, or to dynamically control an operating envelope associated with an implement of the vehicle 100. In some embodiments, the commands, data, or information transmitted from or received by each beacon device 200 is related to both the coordination of lighting devices 230 or alert devices 250 and the enforcement of one or more virtual boundaries. Each of these examples is discussed in detail below with reference to FIGS. 4-6.

Because the controller 220 may be communicably coupled to the vehicle 100, commands, data, or information transmitted from the beacon device 200 to the vehicle 100 may influence or control various vehicle systems, such as various hydraulic systems, electrical systems, electromechanical systems, lighting systems, or otherwise as described above. In various exemplary embodiments, however, the controller 120 of the vehicle 100 is a primary (or master) controller from which each of the controllers 220 of the beacon devices 200 receives commands, data, and information to control the beacon devices 200 in various ways, rather than the beacon devices 200 controlling the vehicle 100. However, because the beacon devices 200 communicate with the vehicle 100, the beacon devices 200 may also transmit commands to the vehicle 100 that, for example, affect the operation the lift assembly 140 to prevent the lift assembly from extending beyond a virtual fence.

As shown in FIG. 3, a plurality of the lighting devices 230 positioned at various locations on the beacon device 200. In some embodiments, the beacon device 200 includes a single lighting device 230. In other embodiments, the beach device 200 does not include a lighting device 230. In embodiments where the beacon device 200 includes one or more lighting devices 230, the beacon device 200 may be configured as or to operate like a battery-powered road flare. Like the lighting devices 130 of the vehicle 100 described above, the lighting devices 230 of the beacon device 200 may be configured to emit a light in various colors, patterns, intensities, etc. For example, the lighting devices 230 could emit a pulsing light, a strobing light, a constant light (e.g., spotlight), colored lights, etc. The lighting devices 230 may be flashing lights or controlled to flash such that, when flashing, indicate that the location of the beacon device 200 is the scene of an emergency. The lighting device 230 may be illuminated and/or controlled to alert bystanders to a potentially dangerous situation or zone for which they should keep out. One or more of the lighting devices 230 may be configured to emit a constant, bright light in order to illuminate a scene so that operators, emergency personnel, etc. may be able to see an otherwise dark emergency scene, for example. Each of the plurality of lighting devices 230 of a respective beacon device 200 may be operated individually, in combination with other lighting devices 230 of the respective beacon 200, or in a predefined sequence in coordination with the lighting devices 230 of other beacon devices 200 (e.g., meshed battery-powered road flares), the lighting devices 130 of the vehicle 100, and/or the lights of other assets on scene.

Along with the lighting devices 230, the beacon device 200 may also include one or more additional alert devices 250, such as a siren, speaker, or similar device. The alert device 250 may be configured to provide an audible indication of a status of the beacon device 200 or a vehicle 100. According to an exemplary embodiment, the alert devices 250 is configured to produce a noise that is configured to alert bystanders to an emergent situation or dangerous environment, such an emergency scene or similar. In some embodiments, the alert devices 250 is or includes a loudspeaker or similar device configured to broadcast a verbal message to bystanders. In various embodiments, the alert devices 250 can be operated independent from or in connection with the operation of the lighting devices 230.

The battery 240 of the beacon device 200 may be configured to provide electrical power to the beacon device 200 so that the beacon device 200 may operate in a remote or portable fashion. For example, the battery 240 may provide power to each of the communication interface 210, the controller 220, the lighting devices 230, the alert devices 250, the sensors 260, and/or the location monitoring device 270 so that the beacon device 200 may operate as herein described. Because the beacon devices 200 may be positioned remotely around a vehicle 100 at a scene which may be along a country road or other location where no electrical outlets or other power source may be readily available, the beacon devices 200 may utilize the battery 240 to provide portable power. According to an exemplary embodiment, the battery 240 may be rechargeable via connection to a power source (e.g., via 120V outlet, USB-C, micro-USB, a docking station on the vehicle 100, a portable docking station with a larger battery, etc.). The battery 240 may also include a plurality of batteries that collectively comprise the battery 240, such as multiple lithium ion (Li-ion) battery cells, lead-acid battery cells, nickel-cadmium (NiCd) battery cells, nickel-metal hydride (NiMH) battery cells, alkaline batteries, and/or still other type of batteries.

The sensors 260 of the beacon device 200 may be a variety of different sensors configured to measure and record various types of data. According to an exemplary embodiment, the sensors 260 of the beacon device 200 are communicably coupled to the controller 220 such that the controller 220 may monitor, read, and/or receive data from the sensors 260 for the purpose of controlling the beacon device 200, the vehicle 100, and/or other beacon devices 200 based on the recorded sensor data. In some embodiments, the sensors 260 are configured to continuously or periodically record data. In other embodiments, the sensors 260 are configured to record when prompted by the controller 220. A plurality of sensors 260 may be positioned at various locations on the beacon device 200 such that measurements may be taken, and data may be recorded in relation to various sides or surfaces of the beacon device 200. For example, the beacon device 200 may include a sensor 260 positioned on a top surface and each of four side surfaces, as is shown in FIG. 3. The plurality of sensors 260 may include a variety of different sensors, including a motion sensor, a proximity sensor, a noise detection sensor (e.g., noise-activated microphone), etc.

In some embodiments, the sensors 260 include a motion sensor configured to detect motion of an object relative to the beacon device 200. The motion sensor may be configured to detect motion using any motion-sensing technology as is well understood in the art, including optical sensor, infrared, passive infrared, radar, microwave, ultrasonic, tomographic, etc. In one embodiment, the sensor 260 is a motion sensor configured to detect the movement of the lift assembly 140 relative to the beacon device 200 for the purpose of determining a position of the lift assembly 140 or to establish a virtual fence by which to control the lift assembly 140. The beacon device 200 may be configured to transmit a notification to the controller 120 of the vehicle 100 when movement is detected by the beacon device 200, such as when a person walks past or the lift assembly 140 passes over the beacon device 200 and/or crosses a virtual fence defined by the beacon devices 200.

In some embodiments, the sensors 260 additionally or alternatively include one or more proximity sensors that is configured to determine the position of the beacon device 200 relative to another object, such as the vehicle 100 or the lift assembly 140 of the vehicle 100. The proximity sensors may be configured to communicate with one or more other beacon devices 200, the controller 220, and/or the vehicle 100 in order to determine when an object—such as the lift assembly 140—is within a predetermined distance of the beacon device 200. In such embodiments, the proximity sensors may facilitate determining proximity of an object to the beacon device 200 by measuring signal strength, a time between transmitted signals, etc. The proximity sensors may be ultrasonic rangefinder devices, for example. In other embodiments, the proximity sensors are radio frequency identification (RFID) devices or ultra-wideband (UWB) devices that facilitate monitoring the precise location of beacon device 200 with respect to a reference point or points, such as the lift assembly 140, the vehicle 100, or one or more other beacon devices 200 using machine to machine (M2M) communication. In another embodiment, the proximity sensors are configured to facilitate determining a precise distance between the beacon device 200 and a nearby object, such as another beacon device 200, the vehicle 100, the lift assembly 140, other connected assets (e.g., another vehicle), or non-connected objects (e.g., bystanders, etc.). For example, the beacon device 200 may be configured to determine that a bystander is approaching the beacon device 200 and may provide a related indication to the controller 220, whereby the controller 220 may cause the alert device 250 to emit a sound (e.g., alarm, warning message, etc.) to warn the bystander of a potential danger. In some embodiments, the proximity sensor is configured to facilitate determining that the lift assembly 140 is within a predetermined distance of the beacon device 200 and may provide a related indication to the controller 220, which further provides an indication to the controller 120 of the vehicle 100 (via the communication interface 110), whereupon the vehicle 100 may issue a command to the lift assembly 140 to restrict a certain movement of the lift assembly, such as an extension of the one or more ladder elements and/or further rotation thereof, for example.

The location monitoring device 270 of the beacon device 200 may be configured to determine the location of the beacon device 200. More specifically, the location monitoring device 270 may be a global positioning receiver configured to communicate with one or more global positioning satellites to precisely determine the location of the beacon device 200 via trilateration or some other means. According to an exemplary embodiment, the location monitoring device 270 of the beacon device 200 is communicably coupled to the controller 220 such that the controller 220 may monitor, read, or receive location data for the purpose of controlling the beacon device 200, the vehicle 100, and/or other beacon devices 200 based on the determined location of the beacon device 200. In some embodiments, the location monitoring device 270 is configured to continuously or periodically monitor the location of the beacon device 200. In some embodiments, the location monitoring device 270 is configured to determine the location of the beacon device 200 when prompted by the controller 220. According to an exemplary embodiment, the location data associated with the beacon device 200 is acquired by the controller 220 and subsequently transmitted via the communication interface 210 to the vehicle 100, whereupon the controller 120 may monitor the location of the beacon device 200 and other beacon devices 200 for the purpose of identifying and monitoring a perimeter of a scene, for example. In some embodiments, the vehicle 100 is additionally or alternatively configured to use the location data of the one or more beacon devices 200 to establish a virtual fence around the vehicle 100 and may restrict or otherwise control the motion of the lift assembly 140 with respect to the virtual fence.

In some embodiments, the lighting devices 230, the alert devices 250, the sensors 260, and/or the location monitoring device 270 itself includes a communication interface (similar to the communication interface 210) and a controller (similar to the controller 220) so that the lighting devices 230, the alert devices 250, the sensors 260, and/or the location monitoring device 270 may individually communicate with other beacon devices 200, the vehicle 100, or otherwise. In such embodiments, a first command may be received by a lighting device 230 pertaining to the operation of the lighting device 230, a second and separate command may be received by the sensors 260 pertaining to operation of the sensors 260, etc.

While the beacon devices 200 are described above as being remotely located from the vehicle 100, the beacon devices 200 may also be affixed to the vehicle 100. For example, one or more of the lighting devices 130 of the vehicle 100 may be beacon devices 200. Accordingly, the lighting devices 130 may also include all of the functionality associated with the beacon devices 200 as herein described, such as signal transmission capabilities, light and sound emittance, position-monitoring capabilities via GPS, RFID, UWB, or other technology, etc.

According to an exemplary embodiment, a plurality of beacon devices 200 may be used at a scene, as is described in the various circumstances below represented in FIGS. 4-6. In such embodiments, each of the beacon devices 200 may be communicably coupled to one or more plurality of beacon devices 200 and the vehicle 100. By way of example, one of the beacon devices 200 may function as a hub or master beacon device that communicates with (i) the other beacon devices 200, (ii) the vehicle 100, and/or (iii) other assets on scene. In such an example, the hub or master beacon device may be configured to (a) relay information received from the other beacon devices 200 to the vehicle 100 and/or other assets on scene and/or (b) relay commands from the vehicle 100 and/or other assets on scene to the other beacon devices 200. By way of another example, each of the beacon devices 200 communicate directly with the vehicle 100, other assets, and/or the other beacon devices 200 on scene. In some embodiments, one or more of the beacon device 200 is configured to communicably couple with additional vehicles or other assets, such as a remote dispatch center, a plurality of mobile devices of personnel located at the scene, or otherwise. The plurality of beacon devices 200 may be communicably coupled in a mesh network arrangement. In some embodiments, each of the devices 200 is configured to communicably couple to every other beacon device 200 via a fully connected mesh network. In other embodiments, the plurality of beacon devices 200 are configured to form a partially connected network whereby each of the beacon devices 200 is communicably coupled to a subset of the plurality of beacon devices 200, such as only to those beacon devices 200 within a predetermined range or distance. The mesh network formed by the plurality of beacon devices 200 may be a self-healing network such that the network operates even if/when a beacon device 200 ceases to function or is otherwise disconnected from the network. Relatedly, the mesh network may "self-heal" or reconfigure itself using shortest path bridging and/or transparent interconnection of lots of links. In various embodiments, the mesh network of beacon devices 200 communicates messages using one of various routing techniques where data, information, or commands are propagated through the mesh network, such as a unicast method (message propagated to a single, specific beacon device 200), a multicast method (message propagated to a subset of the beacon devices 200), a broadcast method (message propagated to all of the beacon devices 200), or an anycast method (message propagated to the nearest beacon device 200). In various embodiments, the mesh network includes the vehicle 100, other vehicles or assets, and/or a central dispatch center.

The network may take different topological forms. For example, the network may be configured in a star arrangement where the vehicle 100 operates as a central hub for the network, such that every other device (e.g., beacon devices 200) is connected to the vehicle 100 while every other devices is only coupled to select devices (e.g., neighboring beacon devices 200). The vehicle 100 may, therefore, transmit information, data, or commands to each of the connected beacon devices 200. In other embodiments, the network could be formed as a ring, a tree, or some other topological arrangement.

Figure 4:
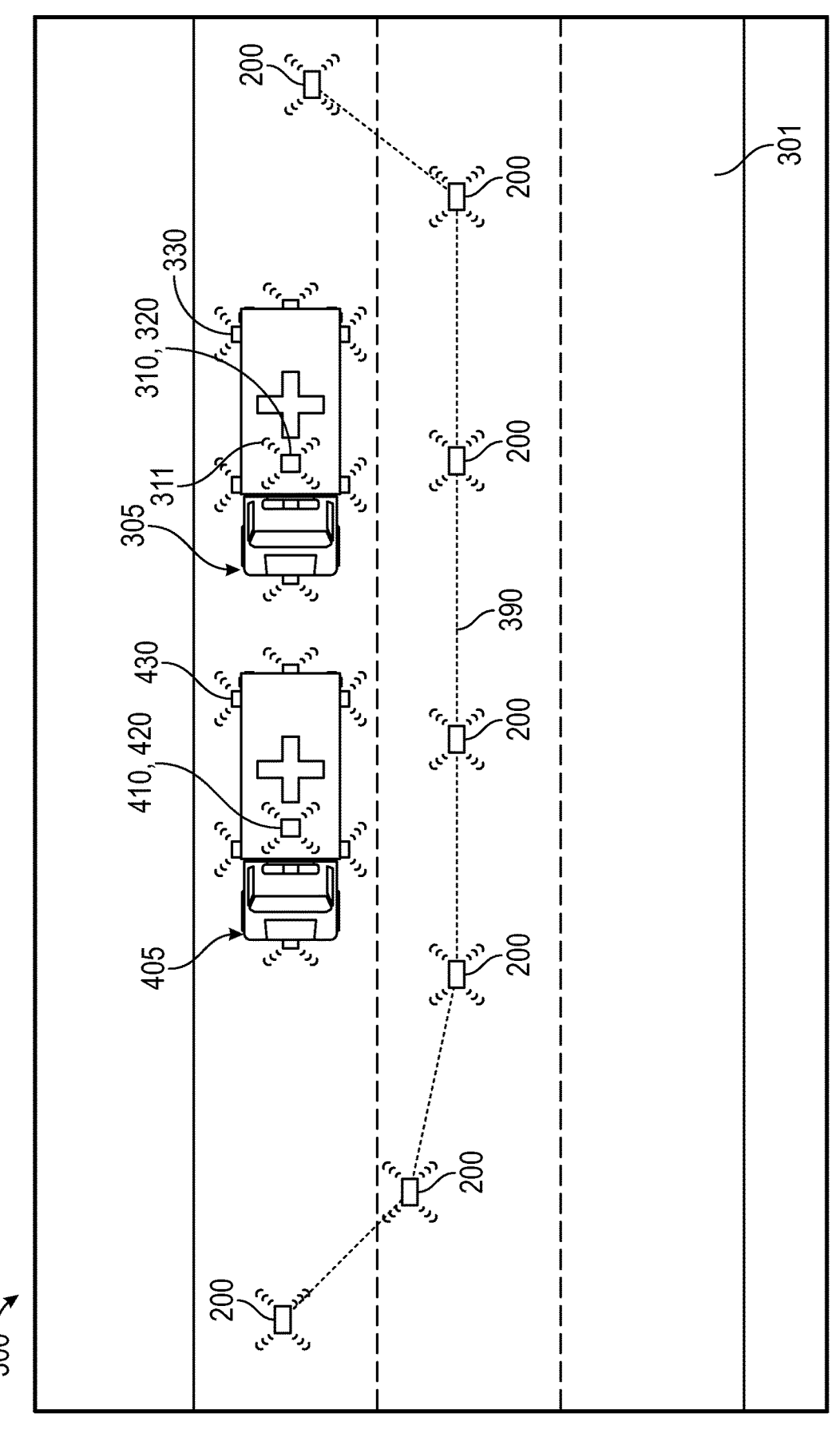
FIG. 4 is a diagram showing emergency vehicles and a plurality of beacon devices at a scene, according to an exemplary embodiment.

Referring now to FIG. 4, a first scene 300 is shown. The scene 300 includes a primary asset 305, a secondary asset 405, and a plurality of beacon devices 200. The primary asset 305, the secondary asset 405, and the beacon devices 200 may be positioned on a roadway 301, as may be the case if the scene 300 is the scene of an automobile accident or road construction site, for example. According to an exemplary embodiment, the primary asset 305 is similar to the vehicle 100 described above. The primary asset 305 may include a communication interface 310, a controller 320, and one more lighting devices 330. The communication interface 310 can be similar to or the same as the communication interface 110 as discussed above. The controller 320 can be similar to or the same as the controller 120 as discussed above. The lighting devices 330 can be similar to or the same as the lighting device 130 as discussed above. The communication interface 310 may be configured to transmit a signal 311 in response to a command or prompt from the controller 320, according to an exemplary embodiment. The secondary asset 405 may likewise include a communication interface 410, a controller 420, and at least one lighting device 430. For example, the secondary asset 405 can be or include a beacon device 200. The secondary asset 405 can be a second vehicle including at least one beacon device 200, at least one lighting device 130, or some other device that can be communicably coupled with the primary asset 305 or with a beacon device 200 of the primary asset 305.

As shown in FIG. 4, a plurality of the beacon devices 200 are positioned on the roadway 301 to establish a boundary proximate to the primary asset 305 and the secondary asset 405. The placement of the beacon devices 200 around the primary asset 305 and the second asset 405 allows for a virtual boundary 390 to be established around the primary asset 305 and the secondary asset 405. As described above, the virtual boundary 390 may be established using the plurality of beacon devices 200, where each beacon device 200 is in communication with one or more other beacon devices 200, a master or hub beacon device, the primary asset 305, and/or the secondary asset 405. In some embodiments, each beacon device 200 is communicably coupled to two other beacon devices 200, namely the two beacon devices 200 that are positioned closest to it. In some embodiments, each beacon device 200 is communicably coupled to all other beacon devices 200 within a predetermined distance of the said beacon device 200. In some embodiments, each of the beacon devices 200 is communicably coupled to all other beacon devices 200 deployed at the scene 300, regardless of distance. In some embodiments, each beacon device 200 is communicably coupled to a master or hub beacon device 200. In some embodiments, each beacon device 200 is communicably coupled to the primary asset 305. In some embodiments, each beacon device 200 is communicably coupled to the secondary asset 405. In some embodiments, only the master or hub beacon device 200 is communicably coupled to the primary asset 305 and/or the secondary asset 405.

In various embodiments, one or more of the beacon devices 200 (e.g., the master or hub beacon device, each beacon device, etc.) is communicably coupled to the primary asset 305 and may further be configured to receive information, data, or commands from the controller 320 of the primary asset 305 sent via the communication interface 310. According to an exemplary embodiment, the primary asset 305 is configured to transmit a command to one or more of the beacon devices 200, where the command is configured to control or manage the operation of the lighting devices 230, the alert devices 250, the sensors 260, and/or the location monitoring device 270 of the beacon devices 200. In particular, the command may cause the lighting device 230 of each beacon device 200 to operate in a particular way (e.g., emit a flashing light, a strobing light, etc.) Moreover, because each of the beacon devices 200 is communicably coupled to the primary asset 305 (e.g., directly, indirectly, etc.), the primary asset 305 may collectively control the plurality of beacon devices 200 in a particular way, such as to cause each of the beacon devices 200 to selectively emit light via the lighting device 230 in a sequential manner, in a pattern, in an alternating fashion, or otherwise. For example, the primary asset 305 may cause the lighting devices 230 of each beacon device 200 to selectively emit light based on a position of the beacon device 200 relative to the primary asset 305 such that the lighting device 230 may emit light according to a pattern. For example, the pattern may be a sequential pattern whereby beacon devices 200 nearest to the primary asset 305 illuminate first, followed by the next nearest beacon devices 200, etc. until the farthest beacon device 200 illuminates or vice versa. Such pattern provided by the lighting devices 230 may also be coordinated with the lighting devices 330 of the primary asset 305 and/or the lighting devices 430 of the secondary asset 405 (e.g., by the controller 320, by the controller 220 of the master/hub beacon, by a remote command center/server, etc.) such that all of the lighting devices on scene are coordinated to provide a comprehensive and coordinated scene lighting system.

The signal 311 transmitted from the primary asset 305 may be directional, such that the lighting devices 230 of the beacon devices 200 positioned proximate to a first end of the primary asset 305 (e.g., the rear of an emergency vehicle) illuminate according to a first pattern, while the lighting devices 230 of the beacon devices 200 positioned proximate to a second end of the primary asset 305 (e.g., the front or side of an emergency vehicle) emit light according to as second, different pattern, or in alternating fashion with the beacon devices 200 positioned elsewhere (e.g., rearward of the primary asset 305). In some embodiments, the controller 320 is configured to determine a position of connected beacon devices 200 using location data associated with each beacon device 200, such as the location information determined by the location monitoring device 270. The controller 320 may then be configured to control each respective beacon device 200 based on the position thereof relative to the primary asset 305 or their location generally within/ along the virtual boundary 390.

In various embodiments, the primary asset 305 provides the signal 311 that controls or otherwise influences the operation of the other connected devices, such as beacon devices 200, the secondary asset 405, or other assets located at or remotely from the scene 300. Put another way, the beacon devices 200 and various components or systems of the secondary asset 405 (e.g., the lighting devices 430 or other devices) may operate or function according to a command delivered by the primary asset 305 via the signal 311. In this way, the beacon devices 200 and the secondary asset 405 may be communicably centralized around the primary asset 305. In other embodiments, however, the control may be centralized in another manner. For example, one of the beacon devices 200 may control or influence the operation of the primary asset 305, the secondary asset 405, and/or the other beacon devices 200. In another embodiment, a remotely located command center/server may provide a command to the primary asset 305 via the communication interface 310, which is then pushed to the beacon devices 200 and secondary asset 405 via the primary asset 305. In yet another embodiment, each of the connected devices (e.g., the primary asset 305, the secondary asset 405, and the beacon devices 200) may each be configured to provide information, data, or commands to all of the other connected devices, regardless of the connected device network configuration (fully connected mesh, partially-connected mesh, etc.).

In various embodiments, the virtual boundary 390 is an enforceable boundary. More particularly, the sensors 260 of the various beacon devices 200 may establish and enforce a virtual boundary 390 using a combination of proximity sensors, motion sensors, optical laser sensors, and/or some other device to determine if an object crosses the virtual boundary 390. In these circumstances, if an object crosses the virtual boundary 390, a notification may be transmitted by one or more beacon devices 200 to the controller 320 of the primary asset 305, the master/hub beacon device 200, and/or the remote command center/server as to the breach. Furthermore, the one or more beacon devices 200 may be configured to emit a visual or audible indication to bystanders that the virtual boundary 390 has been crossed or about to be crossed. In other embodiments, the virtual boundary 390 is only an illuminated boundary that is not enforced in any manner (such as by transmitting a signal to the primary asset 305 that the virtual boundary 390 has been crossed) but instead serves as a visual indication of the perimeter of the scene 300. Data regarding the virtual boundary 390 can be communicated to GPS applications or services (e.g., Waze, etc.) by the primary asset 305, by the master/hub beacon device 200, by the remote command center or server, or in some other manner, which can display information regarding the scene in the GPS applications (e.g., lane closures, scene perimeter, etc.) to approaching vehicles for advanced warning.

As will be appreciated, the arrangement of the beacon devices 200 shown in FIG. 4 may change to suit the needs of a particular scene 300. For example, the physical position of the beacon devices 200 may change relative to the primary asset 305, relative to the roadway 301, etc. Moreover, the operation of the lighting devices 230 may vary such that the lighting devices 230 may emit light in sequential or patterned manner in one circumstance to warn bystanders of potential danger or may emit bright light to illuminate a dark area in another circumstance. In other embodiments, the virtual boundary 390 may be a motion-sensor enforced boundary in some circumstances whereby a signal is transmitted to the primary asset 305 if an object or bystander crosses the virtual boundary 390. In other circumstances, the virtual boundary 390 may be enforced by audible alarms that are triggered when an object or bystander crosses the boundary 390.

Figure 5:
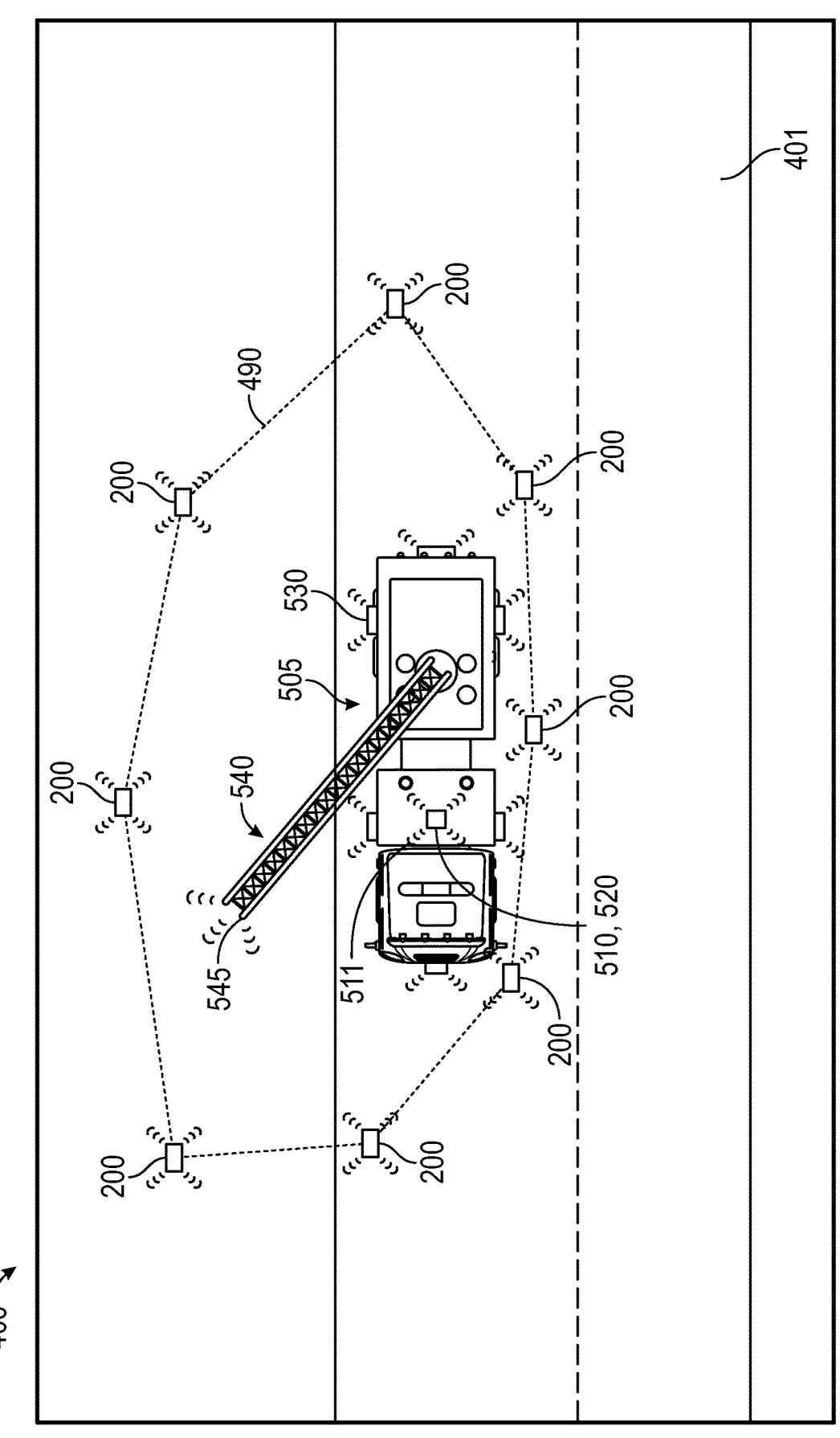
FIG. 5 is a diagram showing an emergency vehicle and a plurality of beacon devices at another scene, according to an exemplary embodiment.

Referring now to FIG. 5, a second scene 400 is shown. Like the scene 300 described above with reference to FIG. 4, the scene 400 includes a primary asset 505 and a plurality of beacon devices 200 placed on or proximate to a roadway 401. The primary asset 505 may also include a communication interface 510, a controller 520 that is communicably coupled to the communication interface 510, and a plurality of lighting devices 530. The communication interface 510 can be similar to or the same as the communication interface 110 as discussed above. The controller 520 can be similar to or the same as the controller 120 as discussed above. The lighting devices 530 can be similar to or the same as the lighting device 130 as discussed above. Although not shown, the primary asset 505 may also include an alert device, one or more sensors positioned at various locations on or proximate to the primary asset 505, and a location monitoring device. In some embodiments, the lighting devices 530 may be contained within beacon devices akin to beacon devices 200, which may also include alert devices, sensors, location monitoring devices, etc. as described above with reference to FIG. 3.

As shown in FIG. 5, the primary asset 505 includes a lift assembly 540, much like the lift assembly 140 described above with reference to FIGS. 1 and 2. The lift assembly 540 may be an extendable ladder or other device (e.g., crane, boom assembly, bucket assembly, etc.) that is configured to rotate about a pivot axis relative to the primary asset 505. Accordingly, the lift assembly 540 may extend beyond the primary asset 505 in a plurality of angles and/or to a plurality of lengths. The lift assembly 540 may also include a plurality of sensors 545 positioned on or proximate to the lift assembly 540. These sensors 545 may be proximity sensors, position sensors such as GPS devices or other location monitoring devices, optical sensors, RFID sensors, UWB sensors, or some other sensor configured to determine a position of the lift assembly 540 relative to some reference point.

Much like the primary asset 305 described in FIG. 4, the communication interface 510 of the primary asset 505 may broadcast a signal 511. The signal 511 may be configured to transmit information, data, or commands to one or more devices that are communicably coupled to the primary asset 505 via the communication interface 510 or otherwise. For example, the plurality of beacon devices 200 may be communicably coupled to the primary asset 505 and may thus be configured to receive the signal 511. Likewise, various other assets (e.g., other vehicles), remote dispatch centers, mobile devices of nearby emergency operators, etc. may also be communicably coupled to the primary asset 505 and configured to receive the signal 511. One or more of the connected devices may also be configured to transmit signals to the primary asset 505, as is described above.

As shown in FIG. 5, the plurality of beacon devices 200 are arranged around the primary asset 505 such that the primary asset 505 is within a virtual boundary 490. The virtual boundary 490 may be formed by the plurality of beacon devices 200 that are communicably coupled to each other (e.g., via mesh network or otherwise). While the virtual boundary 490 is shown as forming a complete boundary around the primary asset 505, the virtual boundary 490 may form a partial boundary (e.g., on one side of the primary asset 505, a three or less sides of the primary asset 505, etc.). In some embodiments, each of the beacon devices 200 is communicably coupled to two or more other beacon devices 200 (i.e., neighboring beacon devices 200) and the primary asset 505. In some embodiments, each of the beacon devices 200 is communicably coupled to the primary asset 505 and not to any other beacon devices 200. In yet another embodiment, the beacon devices 200 may be communicably coupled to a remote dispatch center and not to the primary asset 505, where the remote dispatch center is also communicably coupled to the primary asset 505 and configured to coordinate the operation of the beacon devices 200 and primary asset 505. In some embodiments, each beacon device 200 is communicably coupled to a master or hub beacon device 200 and the master or hub beacon device 200 communicates with the primary asset 505 or the remote dispatch center.

The primary asset 505 may transmit the signal 511 to the beacon devices 200 for the purpose of coordinating or synchronizing lighting devices 530 and lighting devices 230, as is described in detail above with reference to FIG. 4. Furthermore, the primary asset 505 may transmit the signal 511 to the plurality of the beacon devices 200 to operate the alert devices 250, the sensors 260, and/or the location monitoring devices 270 in a particular way. Each beacon device 200 may be controlled individually, multiple beacon devices 200 may be controlled in a group, or all of the beacon devices 200 may be controlled together (i.e., the command from the primary asset 505 applies globally to all beacon devices 200 belonging to the mesh network). In some embodiments, the primary asset 505 may communicate with the beacon devices 200 to enforce the virtual boundary 490 via motion sensors or optical sensors to detect when an object crosses the virtual boundary 490. By detecting when objects cross the virtual boundary 490, the controller 520 may track the number of assets located within the virtual boundary, for example. As described above, numerous other configurations are possible in order to suit the needs of a particular situation.

The primary asset 505 may be communicably coupled to the plurality of beacon devices 200 in order to establish and enforce the virtual boundary 490 with respect to the lift assembly 540 of the primary asset 505. As noted above, a virtual boundary may be established to control or influence the operation of the lift assembly 540 such that the lift assembly 540 may not extend beyond the virtual boundary 490. For example, the controller 520 of the primary asset 505 may define the precise location of the virtual boundary 490 by monitoring the locations of the beacon devices 200 as determined by the location monitoring devices 270 and transmitted to the primary asset 505 via the communication interfaces 210, 510. Using the position of the virtual boundary 490 and location data associated with the lift assembly 540 (e.g., location data provided by sensors 545), the controller 520 may determine when the lift assembly 540 crosses or is proximate to the virtual boundary 490 and may correspondingly transmit a signal to one or more other systems to restrict or prevent an operation of the lift assembly 540 (e.g., preventing further extension of the lift assembly 540 or preventing further rotation of the lift assembly 540). In another embodiment, the sensors 545 of the lift assembly 540 may be configured to determine an approximate distance of the lift assembly 540 from the beacon devices 200 by measuring the strength of the signal 211 broadcast from one or more beacon devices 200. When the signal strength reaches a threshold value, the controller 520 may determine that the lift assembly 540 is within a threshold distance of the virtual boundary 490 and may correspondingly alter the operations of the lift assembly (e.g., restrict the speed at which the lift assembly 540 may be extended).

In some embodiments, the controller 520 is configured determine a position of the lift assembly 540 via one or more sensors 545 coupled to the lift assembly 540, such as the lift angle sensor 141, turret rotation sensor 142, length sensors 143, proximity sensors 144 discussed above with reference to FIG. 2. The controller 520 may compare this determined location with a known position of the virtual boundary 490, as established by location data associated with the beacon devices 200, for example. In this way, the controller 520 may control the operation of the lift assembly 540 to prevent it from crossing the virtual boundary 490 without any direct communication between sensors (e.g., sensors 545) of the lift assembly 540 with the beacon devices 200. In various other configurations, the controller 520 of the primary asset 505 may alter the operation of the lift assembly 540 based on the relative position of the lift assembly 540 to the virtual boundary 490 using some other means (e.g., based on commands received from the master or hub beacon device 200 regarding the virtual boundary 490).

According to an exemplary embodiment, the primary asset 505 is communicably coupled to one or more beacon devices 200 both (a) to establish the virtual boundary 490 for controlling the lift assembly 540 and (b) to coordinate the operation of the primary asset 505 with the one or more beacon devices 200 in some other manner. For example, the lighting devices 230 of the plurality of beacon devices 200 may be coordinated with the lighting devices 530 of the primary asset 505 while the beacon devices 200 are also used to maintain the virtual boundary 490.

Because the beacon devices 200 are portable (i.e., moveable), the virtual boundary 490 may be changed as the beacon devices are moved. As the virtual boundary 490 changes in size and shape, the operating envelope in which the lift assembly 540 may operate without prompting the controller 520 to alter or restrict said operation may change. For example, as the beacon devices 200 are moved farther from the primary asset 505, the virtual boundary 490 expands and the area within the virtual boundary 490 likewise expands. As the beacon devices 200 are moved closer to the primary asset 505, the virtual boundary 490 contracts and the area within the virtual boundary 490 decreases. In this way, the operating envelope associated with the lift assembly 540 may be dynamic.

Figure 6:
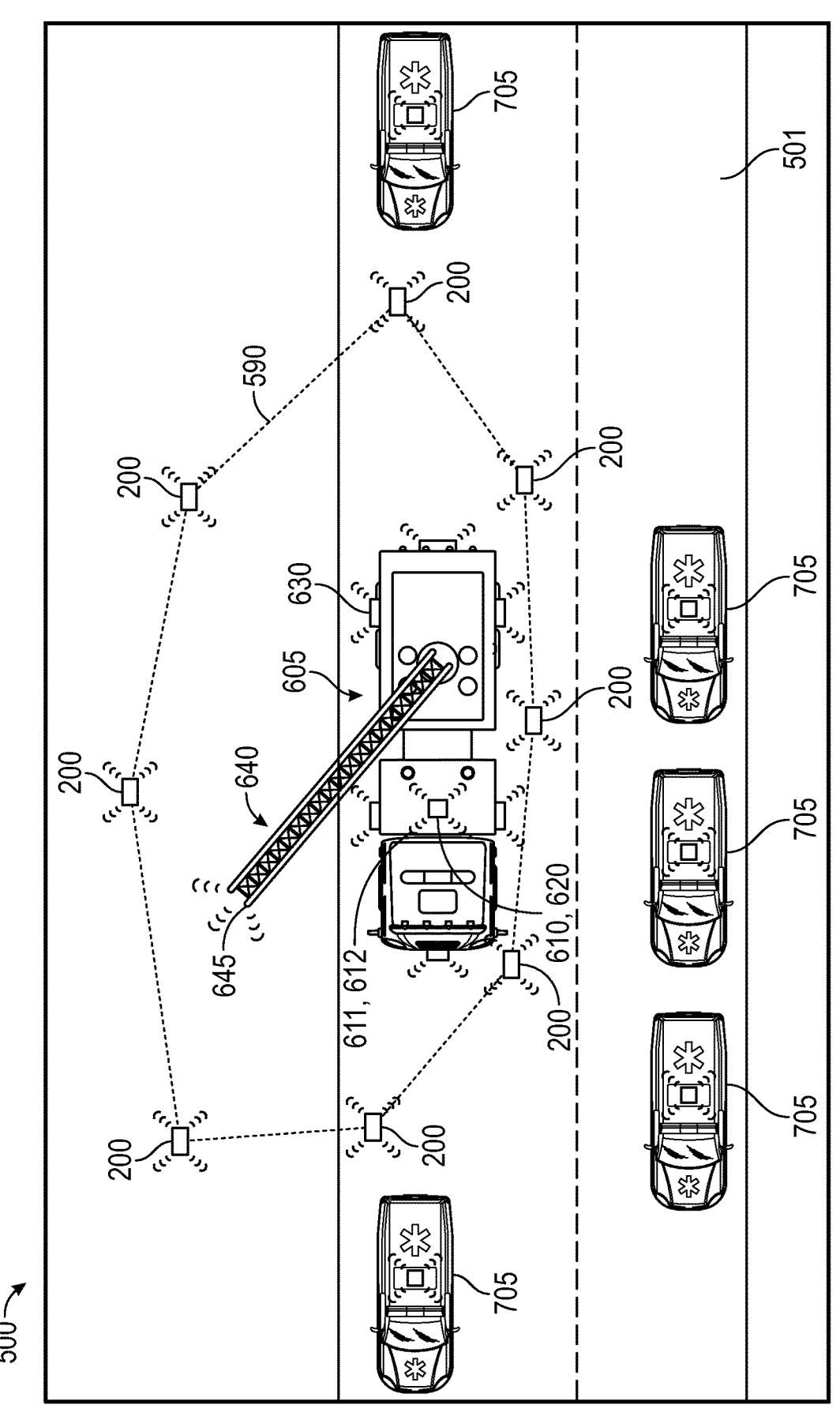
FIG. 6 is a diagram showing a plurality of emergency vehicles and a plurality of beacon devices at another scene, according to an exemplary embodiment.

Referring now to FIG. 6, a scene 500 is shown. Like the scene 400 described above with reference to FIG. 5, the scene 500 includes a primary asset 605 and a plurality of beacon devices 200. The scene 500 also includes at least one secondary asset 705. The secondary asset 705 can be or include a beacon device 200. For example, the secondary asset 705 can be a second vehicle including at least one beacon device 200, at least one lighting device 130, or some other device that can be communicably coupled with the primary asset 605 or with a beacon device 200 of the primary asset 605. The primary asset 605 may include a communication interface 610, a controller 620 that is communicably coupled to the communication interface 610, a plurality of lighting devices 630, and a lift assembly 640 that includes at least one position sensing device 645. The communication interface 610 can be similar to or the same as the communication interface 110 as discussed above. The controller 620 can be similar to or the same as the controller 120 as discussed above. The lighting devices 630 can be similar to or the same as the lighting device 130 as discussed above. The lift assembly 640 can be similar to or the same as the lift assembly 140 as discussed above. The position sensing devices 645 can be or include a proximity sensor, global positioning system device, RFID devices, UWB devices, or some other device configured to determine a position of the lift assembly 640. For example, the position sensing device 645 can be a proximity sensor configured to determine a position of the lift assembly 640 relative to a beacon device 200 or a virtual boundary 590 defined by a plurality of beacon devices 200.

The plurality of beacon devices 200 at scene 500 may be positioned around the primary asset 605 such that the primary asset 605 is within a virtual boundary 590 defined by the plurality of beacon devices 200. The virtual boundary 590 may be used to alter the operation of the lift assembly 640 in order to prevent extension of the lift assembly 640 beyond the virtual boundary 590. For example, the controller 620 of the primary asset 605 may be configured to cause the lift assembly 640 to stop or limit a movement thereof based on a position of the lift assembly 640 relative to the virtual boundary 590, as determined by the position sensing device 645.

The primary asset 605 may be configured to transmit a plurality of signals to various connected devices, including the plurality of beacon devices 200 and the secondary assets 705. More specifically, the primary asset 605 may be configured to transmit a first signal 611 to the beacon devices 200, where the first signal 611 may include data, information, or commands related to the enforcement of the virtual boundary 590 with respect to the lift assembly 640. The primary asset 605 may further be configured to transmit a second signal 612 to the one or more beacon devices 200 and the secondary assets 705, where the second signal 612 may include data, information, or commands related to the coordination of the primary asset 605 with the beacon devices 200 and the secondary assets 705. In particular, the second signal 612 may be related to the coordination of lighting devices 630 with lighting devices 230 of beacon devices 200 as well as lighting devices associated with the secondary assets 705. Accordingly, various connected devices such as secondary assets 705 may be controlled via signal 612 even when positioned beyond the virtual boundary 590 while connected devices such as the lift assembly 640 may be controlled from within the virtual boundary 590. In other words, the primary asset 605 may separately control assets based on the relative position of those assets to the virtual boundary 590. Assets beyond the virtual boundary 590 may receive commands to coordinate lighting devices, alert devices, etc., while assets within or proximate to the virtual boundary 590 may additionally receive commands related to enforcement of the virtual boundary 590. In some embodiments, the secondary assets 705 are included in and form at least part of the virtual boundary 590.

The system disclosed herein (e.g., an on-scene perimeter system, an on-scene coordination system, etc.) generally relates to coordinating the control of vehicle systems (e.g., vehicle lights, an aerial ladder assembly, boom assembly, etc.) (a) with off-vehicle devices (e.g., meshed battery-powered road flares, lighting systems of proximate vehicles, etc.) and/or (b) based on the position of off-vehicle devices (e.g., meshed beacons, meshed battery-powered road flares, etc.).

In a first implementation, a vehicle (e.g., a response vehicle, a fire truck, a tow truck, a boom lift, a bucket truck, a concrete mixer truck, a dump truck, etc.) includes a control system that communicates with battery-powered road flares. The battery-powered road flares communicate through a mesh network and create a dynamic sequential light pattern between themselves that is dependent on the number of road flares deployed and their respective positions. The control system of the vehicle communicates with the road flares and extends the sequential light pattern through the vehicle's integrated light system in coordination with the road flares to generate an improved warning. This can also be extended to multiple vehicles arranged in a row, creating a meshed scene light perimeter. Data regarding the meshed scene perimeter can be communicated to GPS applications (e.g., Waze, etc.), which can display information regarding the scene in the GPS applications (e.g., lane closures, scene perimeter, etc.) to approaching vehicles. The control system may also be implemented through a master or hub beacon device, or through a remote server.

In a second implementation, the control system communicates with beacons. The beacons can be placed variously about the vehicle (e.g., next to power lines/poles, trees, next to buildings or structures, along the perimeter between a closed lane of traffic and an open lane of traffic, etc.) to form a meshed perimeter around the vehicle. The meshed perimeter functions as a virtual boundary wall to the operational envelope of an aerial (e.g., a boom arm, an aerial ladder, a crane arm, a concrete pumper arm, etc.) of the vehicle. The control system monitors the movement of the aerial and prevents the aerial from extending beyond the virtual boundary wall. The operator of the aerial may be presented with the ability to override and pass through the virtual boundary wall, if needed. The beacons may be integrated into the road flares, and non-road flare beacons and road flare beacons may be used together to define the virtual boundary wall.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system (e.g., coordinated lighting system, meshed beacon or road-flare system, virtual boundary system, etc.) as shown in the various exemplary embodiments is illustrative only. Additionally, any element disclosed in one embodiment may be incorporated or utilized with any other embodiment disclosed herein.

What is claimed is:

1. A vehicle system comprising:
a plurality of portable devices configured to be positioned variously about a scene, each of the plurality of portable devices includes a light;
a vehicle including:
a chassis;
a cab coupled to the chassis;
a body coupled to the chassis; and
a vehicle lighting device coupled to at least one of the cab or the body; and
a control system configured to coordinate operation of the light of each of the plurality of portable devices based on a position of each of the plurality of portable devices relative to the vehicle when the vehicle is at the scene with the plurality of portable devices;
wherein the plurality of portable devices includes:
a first portable device configured to be disposed at a first distance relative to the vehicle, the first portable device including a first light; and
a second portable device configured to be disposed at a second distance relative to the vehicle greater than the first distance, the second portable device including a second light; and
wherein the control system is configured to coordinate operation of the first light and the second light based on the first distance and the second distance relative to the vehicle such that the second light is emitted at a different time than the first light is emitted.

2. The vehicle system of claim 1, wherein the control system is located on the vehicle.

3. The vehicle system of claim 2, further comprising a portable hub device configured to relay communications between the control system on the vehicle and the plurality of portable devices.

4. The vehicle system of claim 1, wherein the control system is configured to be positioned remote from the vehicle.

5. The vehicle system of claim 4, wherein the control system is located on a respective one of the plurality of portable devices.

6. The vehicle system of claim 4, wherein the control system is remote from the vehicle and the plurality of portable devices.

7. The vehicle system of claim 4, wherein the control system is distributed between the vehicle and at least one of the plurality of portable devices.

8. The vehicle system of claim 1, wherein the plurality of portable devices are configured to be positioned to at least partially define a virtual boundary proximate the vehicle.

9. The vehicle system of claim 8, wherein:

the vehicle further comprises an aerial device rotatably coupled to at least one of the chassis or the body; and the control system is configured to restrict operation of the aerial device such that a portion of the aerial device does not cross the virtual boundary defined by the plurality of portable devices.

10. The vehicle system of claim 8, wherein the vehicle is a first vehicle, further comprising a second vehicle configured to be positioned to at least partially define the virtual boundary.

11. The vehicle system of claim 8, wherein the control system is configured to share information regarding the virtual boundary with a GPS service to facilitate providing advanced warning regarding the scene and the virtual boundary to a user of the GPS service.

12. A vehicle system comprising:

a plurality of portable devices configured to be positioned variously about a scene, each of the plurality of portable devices includes a light;

a vehicle including:

a chassis;

a cab coupled to the chassis;

a body coupled to the chassis; and a vehicle lighting device coupled to at least one of the cab or the body; and a control system configured to coordinate operation of the light of each of the plurality of portable devices based on a position of each of the plurality of portable devices relative to the vehicle when the vehicle is at the scene with the plurality of portable devices, wherein the control system is configured to coordinate operation of the light of each of the plurality of portable devices with the vehicle lighting device by controlling illumination of the light of each of the portable devices and the vehicle lighting device according to a predefined or selected sequence or pattern and based on the position.

13. The vehicle system of claim 1, wherein the vehicle is a first vehicle and the vehicle lighting device is a first vehicle lighting device, further comprising a second vehicle including a second vehicle lighting device, and wherein the control system is configured to coordinate operation of the light of each of the plurality of portable devices with the first vehicle lighting device and the second vehicle lighting device.

14. A vehicle system comprising:

a plurality of portable devices, each of the plurality of portable devices includes a light;

a vehicle; and a control system configured to coordinate operation of the light of each of the plurality of portable devices based on a position of each of the plurality of portable devices relative to the vehicle at a scene, wherein the control system is configured to coordinate operation of lights of the plurality of portable devices with a vehicle lighting device of the vehicle by controlling illumination of the lights and the vehicle lighting device according to a predefined or selected sequence or pattern and based on the position.

15. The vehicle system of claim 14, wherein:

the vehicle includes an aerial device; and the plurality of portable devices are configured to be positioned to at least partially define a virtual boundary proximate the vehicle, and wherein the control system is configured to restrict operation of the aerial device such that a portion of the aerial device does not cross the virtual boundary.

16. A vehicle system comprising:

a plurality of portable devices, each of the plurality of portable devices includes a light;

a vehicle; and a control system configured to coordinate operation of the light of each of the plurality of portable devices based on a position of each of the plurality of portable devices relative to the vehicle at a scene;

wherein the plurality of portable devices includes a first portable device and a second portable device configured to be disposed closer to the vehicle than the first portable device; and wherein the control system is configured to control a first light of the first portable device to emit light at a different time than a second light of the second portable device based on positions of the first portable device and the second portable device relative to the vehicle.

17. A vehicle system comprising:

a vehicle including:

a chassis;

a cab coupled to the chassis;

a body coupled to the chassis; and a vehicle lighting system coupled to at least one of the cab or the body; and a control system configured to coordinate operation of the vehicle lighting system and a plurality of portable lighting devices selectively deployed proximate the vehicle by controlling illumination of the plurality of portable lighting devices and the vehicle lighting system (a) according to a predefined or selected sequence or pattern and (b) based on a position of each of the plurality of portable lighting devices relative to the vehicle.

18. The vehicle system of claim 17, further comprising the plurality of portable lighting devices.

* * * * *